United States Patent Office 3,401,216
Patented Sept. 10, 1968

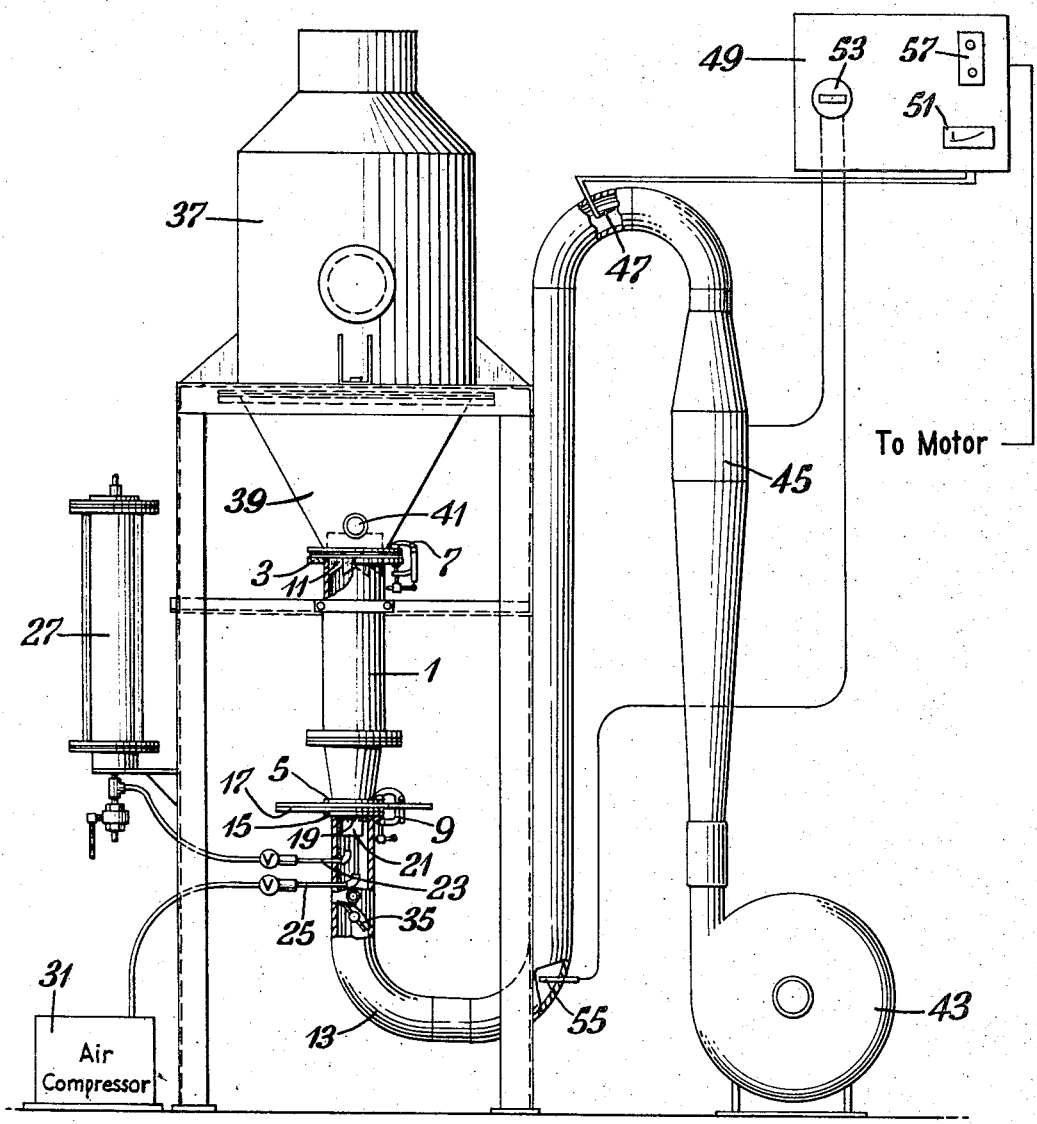

3,401,216
METHODS FOR PREPARING PHARMACEUTICAL
COMPOSITIONS
Vincent Coletta, Westfield, N.J., assignor to Bristol-
Myers Company, New York, N.Y., a corporation
of Delaware
Filed Jan. 9, 1964, Ser. No. 336,728
12 Claims. (Cl. 264—117)

ABSTRACT OF THE DISCLOSURE

Prepares a composite granule (e.g., an effervescent granule) by suspending two materials like an acid and a bicarbonate in a gas stream and contacting these materials with a spray of fluid to cause a momentary reaction and form a composite particle containing acid and bicarbonate.

---

This invention relates to a method for making composite particles containing at least two potential chemically reactive materials adapted to react with each other on their introduction into a suitable medium. More particularly, it relates to a method for making composite particles of an effervescent composition and especially an effervescent pharmaceutical composition of this character.

Effervescent salts, generally in the form of powders, granules, or compressed tablets, constitute a well-known class of pharmaceutical preparations. They generally consist of a pharmaceutically active ingredient or ingredients, an acid, e.g., tartaric and/or citric acids, and a gas generating base, e.g., sodium bicarbonate. Usually they are administered after being put into water wherein they effervesce to form a carbonated saline drink. Specific examples of this type of preparation can be found in the official compendia of pharmacy, the United States Pharmacopeia and the National Formulary. Examples are: Effervescent Sodium Phosphate NF XI; Compound Salt of Potassium Bromide NF VII; Artificial Carlsbad Salt NF VII; Artificial Kissingen Salt NF VII; Artificial Vichy Salt NF VII; Potassium Citrate Effervescent NF IX; Lithium Citrate Effervescent NF VII; Magnesium Sulfate Effervescent NF VII, etc.

One prior art process presently widely employed for preparing compositions of this character involves:

(1) Mixing the dry powders together to form a dry mix, e.g., pharmaceutically active ingredient, acid and a gas generating base;
(2) Adding a small amount of water which starts the effervescence reaction so that a workable mass is obtained;
(3) Quickly drying the mass in ovens or heated dishes to stop the reaction; and
(4) Grinding the mass under dry conditions to form powder or granules and then bottling the product.

Step 2 above was included in the prior art process because it was found that the partially reacted products would form, after grinding, granules or particles containing all of the potentially chemically reactive components. This is an advantage in that the close proximity of the reactants made them available almost immediately for the effervescence reaction. However, this partial reaction produced a mass which, after drying, as noted above, was required to be pulverized to smaller particles before it could be put into suitable form for use.

The reaction started by Step 2 of the process, described above (liberation of carbon dioxide by the reaction of the acid and base) can, obviously, be permitted to proceed only to a very limited extent, lest the effervescent character of the final product be destroyed. Thus, it is important to be able to accurately control the amount of water added. The prior art method, mentioned above, is deficient in this respect.

Techniques, such as moistening the materials with 5% water in alcohol, using the water of hydration of the citric acid by liberating it in situ by heating the salt mix, or using bursts of steam to moisten the material have been used to try to control the reaction extent. These techniques have necessarily made the preparation of effervescent pharmaceuticals unduly cumbersome.

It has now been found that the disadvantages of the prior art processes, outlined above, can be eliminated and many advantages introduced into the process by proceeding as described below. The new technique consists essentially of suspending a dry mixture of the two potential chemically reactive ingredients in powder form in a stream of gas, thereby forming a constantly agitated "fluidized bed" and introducing into this bed just so much of a fluid which causes said chemical ingredients to react to only a limited extent. The fluid is preferably introduced in finely dispersed form causing momentary reaction before it is vaporized.

This action has the effect of joining in single granules the two potential chemically reactive components. It also has the effect of producing granules which are substantially larger than the powder particles of the starting materials.

The present invention also contemplates the formation of granules of this type which have incorporated therein other pharmaceutical agents besides the two potential chemically reactive components mentioned above. They may be introduced either as a third powdered component in the fluidized bed or dissolved or suspended in the liquid agent introduced into said fluidized bed.

It is accordingly an object of the present invention to provide a process for forming composite granules comprising at least two components which are potentially chemically reactive with each other.

It is also an object of the present invention to provide a process for forming composite granules containing at least two components which are potentially capable of chemically combining with each other in a gas forming reaction.

It is a further object of the present invention to provide a process for forming effervescent composite granules containing pharmaceutically active constituents.

Still another object of the present invention is to provide a process of the character set forth in the above objects which avoids the disadvantages mentioned above.

Other and more detailed objects will be apparent from the following description and drawing wherein:

The sole figure is a front elevational view, partly in section, of a device useful in carrying out the process of this invention.

The process of this invention has particular utility in the preparation of pharmaceutical effervescent granules. For the sake of simplicity, this invention will be described with respect to such compositions. It is to be understood, however, that the invention is not limited thereto.

The effervescent pharmaceutical granules embodied in the present invention are prepared by incorporating in the same granules at least two components which when contacted by water will react to produce a gas that gives the effervescence. The most common effervescent producing reactants employed are a pharmaceutically acceptable acid component and carbonating component. As used herein, the term carbonating component refers to any material from which $CO_2$ can be generated by reaction with an acid.

The acid components may constitute a single acidic material or a combination of solid acidic substances which are usually organic in charatcer. Typical acidic materials that are utilizable include citric, fumaric, tartaric, malic, succinic, and acid salts, such as biphosphate, or combinations thereof.

The carbonating component will usually take the form of a carbonate or a bicarbonate or any mixtures thereof. More particularly, they will be pharmaceutically acceptable salts of carbonic acid in any of its forms and especially, the alkali metal carbonates or bicarbonates.

As noted above, the process of this invention involves suspending at least two of the powdered potentially interacting ingredients, e.g., sodium carbonate and citric acid, in a stream of gas and spraying said suspended particles with a spray fluid. The stream of gas is preferably a stream of preheated air which serves to vaporize the liquid of the spray fluid as well as to suspend said powdered materials. A device, such as the Wurster Air Suspension Apparatus or a modified form of it, has been found to be suitable for this purpose.

It has been discovered that a satisfactory product can be produced because the following variables can be efficiently, i.e., effectively and rapidly, controlled: volume and velocity of air passing through the device, air temperature and humidity (hence, drying capacity), and liquid feed rate (hence, amount of water and/or other solvent).

The sole figure of drawing is a representation of a typical Wurster Air Suspension Apparatus which may be used to carry out the present invention. It comprises a removable granulating and drying chamber designated as 1, which is generally cylindrical in shape at the top (drying section) and tapered inwardly at the bottom (granulating section).

Chamber 1 may be made of any suitable material which will not interfere with the process involved. Glass chambers have been found to be quite suitable.

The diameter of chamber 1 may vary depending on the quantity of material to be handled. Chamber diameters of from 6 to 12 inches have been found to be suitable for carrying out the present process although larger, e.g., up to 36 inches in diameter, and smaller chambers can be employed.

Chamber 1 is provided with upper and lower flanges 3 and 5 which serve as supporting surfaces for clamps 7 and 9, by which chamber 1 is removably secured to the rest of the system. Chamber 1 is also provided in its top end with a deflector plate 11. This serves as a baffle to deflect solid particles which are carried upwardly with the stream of hot air and to separate said particles from said stream.

Located across the lower end of chamber 1 is a slidable valve 17 which acts to close off the lower end thereof before the machine is put into operation. This supports the powder charge prior to introduction of the suspending medium into chamber 1.

Slidable valve 17 is positioned between flange 5 of chamber 1 and flange 15 of air duct 13. These flanges and the slide valve 17 are held together by clamp 9.

Situated inside of duct 13 just below slidable valve 17 is screen 19. This extends across the whole cross-sectional area of duct 13 and is of such mesh size as to prevent the powder particles from falling into duct 13, and at the same time to permit the flow of air therethrough. Screen 19, which also controls the air pattern of the air flowing therethrough, contains a centrally disposed hole through which spray nozzle 21 projects from below. This makes possible the introduction of spray fluid into chamber 1 above the level of screen 19.

Spray fluid line 23 and compressed air line 25, each terminate in spray nozzle 21. Any suitable terminal openings of air line and spray fluid line may be employed. In one typical arrangement a series of fluid line openings are disposed around a centrally disposed air opening. The fluid and air coming from their openings commingle just before the nozzle exit to form a spray which is injected into chamber 1.

Spray fluid is supplied to fluid line 23 from spray fluid reservoir 27. The fluid may be delivered under air pressure introduced through an opening in the top of reservoir 27 or a constant feed liquid pump may be used. Air is supplied under pressure to air line 25 by means of air compressor 31.

Spray nozzle 21 may be any of a variety of types. It may be of the suction flow type, fluid pressure type, hydraulic gun type, ultrasonic gun type or any other variety which will serve to break up the spray fluid into small particles and inject them into chamber 1. However, the suction flow type is preferred. The atomization energy is furnished by high pressure air supplied to said spray nozzle at about 30–70 p.s.i. This may be supplied as indicated above by air compressor 31 or by a cylinder of compressed air.

Located above the drying section of chamber 1 there is provided a settling chamber 37 which is connected to chamber 1 by a tapering section 39. Settling chamber 37 may be constructed of any suitable material, e.g. stainless steel, and serves to allow the fine particles to return to the granulating and drying chamber 1, thus preventing them from being carried out with the exhaust air.

Thermometer 41 is located in tapered section 39 so that the outlet temperature of the gas passing through chamber 1 may be recorded. In place of this a continuous temperature recording device may also be employed.

Connected to the lower end of chamber 1 through duct 13 is air blower 43 which supplies the draft of air that suspends the materials in chamber 1. Any type of blower which can supply air at a sufficient rate to maintain the particles and granules in suspension is suitable. A centrifugal (fan) type blower has been found to be quite adequate.

In the preferred form of this invention, the air introduced into chamber 1 is hot air. For this purpose there is provided a heating chamber 45 which heats the air coming from blower 43. Heating chamber 45 may be a steam heat exchanger or may utilize electrical heating elements.

A feature of the present invention is the high degree of control that may be exercised over the various process conditions that may influence the size and the character of the granules produced. This includes control over the rate of flow of air through the duct 13 and the temperature of the air that enters chamber 1. To this end there is provided a control panel 49.

Mounted on control panel 49 is draft gauge 51 which is connected to a Pitot tube 47, located in the top bend of duct 13. This is used to determine the quantity of air flow through the system. Damper 35, located in the downstream end of conduit 13, is used to adjust the volume of air going through the system.

Also mounted on control panel 49 is temperature controller 53 which serves to control the temperature of the air that is introduced into chamber 1. One side of heat controller 53 is connected to thermometer bulb 55 maintained inside conduit 13. The other side of heat controller 53 is connected to the heating means of the heating chamber 45. The heat controller 53 is responsive to the various temperatures sensed by thermometer bulb 55 and acts to vary the temperature in heating chamber 45 accordingly. A dial thermometer 33 is also provided in the end of duct 13 to show the temperature of the air entering chamber 1. A wet bulb thermometer (not shown) may also be provided at this point to determine the humidity of inlet air.

Control panel 49 also supports a starter 57 for the motor (not shown) which runs blower 43.

In operation the powders to be utilized are placed in chamber 1 through the top thereof by removing clamp 9 and swinging the top opening of chamber 1 outwardly. This is accomplished with slidable valve 17 in the closed position as indicated in FIGURE 1. Blower 43 is then turned on which brings a stream of air through duct 13. The heaters are turned on to provide heated air for the process.

Slidable valve 17 is then moved to the open position to allow the hot air into chamber 1. The volume of the air going through chamber 1 is regulated so that the particle and the granules formed are maintained in suspension in the stream of air and not carried out of the top of the apparatus.

Spray fluid and air are simultaneously introduced into spray nozzle 21 from liquid reservoir 27 and air compressor 31. The spray fluid in atomized form is sprayed into the bottom of chamber 1 by spray nozzle 21. The rate of feed of fluid from reservoir 27, the velocity of air going through chamber 1, and the air temperature and humidity are adjusted to give a granule of a predetermined size.

In the chamber 1 the potentially reactive powders react to a limited extent under the effect of the spray fluid. This causes the particles to coalesce to form composite granules. Furthermore, the granules are also quickly dried by the stream of hot air in which they are suspended.

Some of the particles are blown up into settling chamber 37. These will drop back into tapered section 39 and be funneled into chamber 1.

After the treatment is completed, the blower 43 is halted, and the valves feeding the spray nozzle are turned off. The finished granules may then be removed from chamber 1.

As noted above, the present process lends itself to close control of the operating conditions. This in turn makes the process quite versatile. In the table below are listed the various ranges of the operating conditions including the preferred conditions for a 6 inch chamber. These will vary depending on the size of the equipment used, the materials treated, etc.

TABLE I

| | General | Preferred |
|---|---|---|
| 1. Air Flow, Cubic Feet/min. | 10–1,000 | 30–300. |
| 2. Spray Nozzle Opening (inches). | 16/1,000–100/1,000 | 20/1,000–28,1/000. |
| 3. Air Nozzle Opening (inches). | 64/1,000–150/1,000 | 70/1,000–100/1,000. |
| 4. Atomization Pressure (Air Supplied to Spray Nozzle) (p.s.i.). | 15–100 | 60–70. |
| 5. Inlet Air Temp. (Temp. of Air at Inlet End of Chamber 1), ° F. | 110–200 | 120–180. |
| 6. Exhaust Air Temp. (Temp. of Air at Outlet End of Chamber 1), ° F. | 90–150 | 100–140. |
| 7. Inlet Spray Fluid Pressure (Pressure on Spray Fluid Fed to Spray Nozzle) (p.s.i.). | 2–20 | 2–10. |
| 8. Rate of Flow of Spray Fluid to Spray Nozzle, cc./min. | 10–200 | 30–80. |

The process of this invention is of particularly utility in preparing effervescent pharmaceutical compositions which contain as the components of the granules:

(1) a phamaceutically acceptable acid, e.g., citric acid, tartaric acid and mixtures thereof,
(2) a bicarbonate, e.g., sodium bicarbonate, and
(3) sodium biphosphate or monosodium phosphate.

In addition to this, these compositions may also contain sweetening and/or flavoring agents. Compositions of this character have long been used as laxatives.

Several procedures may be used to prepare compositions of this character in accordance with this invention. For example, the organic acid and the sodium bicarbonate may be introduced into the granulating and drying chamber 1 in the form of powders of particle sizes ranging from 10 mesh to 120 mesh, whereas the sodium biphosphate may be dissolved in water. The solution so formed will serve as the spray solution. In this case, the materials may be utilized in the following ranges:

Organic acid 20 to 80% by weight (e.g., citric acid)
Sodium bicarbonate 20 to 80% by weight
Aqueous solution of sodium biphosphate 20 to 60% soluble by weight.

In the case where a combination of organic acids are employed, e.g., citric and tartaric, the tartaric acid constitutes between 20 to 70% of the acid mixture, the remainder being citric acid. In this form of the process the sweetening and flavoring agents are conveniently dissolved in the biphosphate spray liquid.

In still another procedure all of the ingredients incorporated in the granule are utilized in powder form. In this case the spray liquid is only distilled water or steam. In a typical example of this character, the principal components would be monosodium phosphate, tartaric acid, citric acid and sodium bicarbonate. These materials would be present in such a composition in the following ranges:

Percent by weight
Monosodium phosphate _____ 20 to 70
Tartaric acid _____ 5 to 25
Citric acid _____ 10 to 40
Sodium bicarbonate _____ 20 to 80

To this can be added flavoring agents and sweeteners. These agents will generally be utilized in the range of about .1% to 10% by weight.

The following examples are further illustrative of the present invention, it being clearly understood that the invention is not limited thereto.

Example 1

Gm. particle size 20–80
Citric acid _____ 140
Sod. bicarbonate _____ 860
Sod. biphosphate _____ 1000

The 6-inch diameter air suspsension apparatus chamber 1 of the figure of drawing is charged with the citric acid and sodium bicarbonate; the sodium biphosphate is sprayed as a 40% w./w. solution. Running characteristics: air flow=30–60 c.f.m.; spray nozzle opening =$^{20}/_{1000}$ inch; air nozzle opening=$^{70}/_{1000}$ inch; atomization pressure=60 p.s.i.g.; inlet temperature=140 to 160° F.; exhaust temperature=110 to 125° F.; inlet fluid pressure=2 to 7 p.s.i.g. with a flow rate of 30–40 cc./minute. The percentage yield was 95%; the granules obtained were in the range 12 to 20 mesh.

Example 2

| | | Gm. |
|---|---|---|
| Tartaric acid | particle size 20–80 | 1560 |
| Citric acid | do | 600 |
| Sod. bicarbonate | do | 4572 |
| Sod. sucaryl | particle size 100–200 | 78 |
| Water-soluble lemon-lime flavor | particle size 200 mesh | 30 |
| Sod. biphosphate | particle size 20–80 | 5160 |

The 12-inch diameter air suspension apparatus chamber 1 of the figure of drawing is charged with the two acids and the bicarbonate; the sweetener and flavor are dissolved along with the biphosphate, which is sprayed as a 40% w./w. solution. Running characteristics: air flow =180–300 c.f.m.; spray nozzle opening=$^{28}/_{1000}$ inch; air nozzle opening=$^{70}/_{1000}$ inch; atomization pressure=70 p.s.i.g. inlet temperature=160 to 180° F.; exhaust temperature=130 to 140° F.; inlet fluid pressure=10 p.s.i.g. with a flow rate of 60 to 80 cc. per minute. The percentage yield was 98%; the granules obtained were in the range 10–18 mesh.

Example 3

| | Grams | Range, Mesh | Preferred Particle Size, Mesh |
|---|---|---|---|
| Monosodium Phosphate | 860 | 10–200 | 20–80. |
| Tartaric Acid | 260 | 10–200 | 20–80. |
| Citric Acid | 100 | 10–200 | 20–60. |
| Flavor | 5 | 10–200 | 200. |
| Sweetener | 13 | 10–200 | 100–200. |
| Sodium Bicarbonate | 762 | 10–200 | 20–80. |

2 kg. of material are put into the 6-inch diameter air suspension apparatus chamber 1 of the figure of drawing as dry solids. Only distilled water is used to cause the ingredients to react slightly and thus form an expanded granule. Running characteristics: air flow=30 to 90 c.f.m.;

spray nozzle opening=20/1000 inch; air nozzle opening =70/1000 inch; atomization pressure=60 p.s.i.g.; inlet temperature=120 to 140° F.; exhaust temperature=100 to 110° F.; inlet fluid pressure=2 to 5 p.s.i.g. with a flow rate of 60 to 70 cc. per minute. The percentage yield was 95%; the granules obtained were in the range 10–30 mesh. The total time needed was 10 minutes.

Example 4

|  | Grams | Mesh |
|---|---|---|
| Sodium Bicarbonate | 800 | 20–100. |
| Potassium Bicarbonate | 150 | 20–100. |
| Sodium Citrate | 100 | 20–100. |
| Monosodium Phosphate | 250 | 20–80. |
| Citric Acid | 490 | 20–80. |
| APAP (Acetaminophen) | 210 | 50–200. |

The mixture was put into a 6-inch diameter air suspension apparatus chamber 1 of the figure of drawing. The material was then run under the same conditions as Example 3.

In summary, applicant would like to stress that a surprising versatility has been found to be inherent in the present process. Considering the awkward and cumbersome state of the art, this unexpected versatility makes the advancements achieved by the new process quite unique. The new method for preparing effervescent products has the following advantages over the prior art:

(1) The extent of the effervescent reaction can be controlled during preparation of the mass.

(2) Particles are made without the necessity of grinding a dried mass; also, the size of the particles can be controlled.

(3) Commercial sodium biphosphate, which is contaminated with extraneous materials such as dirt and fibers can be used as a filtered solution in typical applications of the process.

(4) The stability of the final product is increased because a protective layer of biphosphate can be built up around the granules.

(5) The distribution of water in the mass can be regulated and made uniform.

(6) Segregation of the initial active ingredients is prevented.

(7) Ovens, trays, and grinders are eliminated.

(8) A product can be made without citric or tartaric acids; the less expensive biphosphate can be used as the acid.

(9) Fines can be elimiated or minimized.

(10) The granules formed can be (after the addition of a suitable lubricant) compressed into tablets.

(11) Additional ingredients, such as therapeutically active substances or flavors, may be conveniently and uniformly added to the effervescent granules after they are formed.

(12) A substantial time and cost saving can be achieved by using the new method.

(13) This method may be made continuous by using multiple chambers; this would eliminate the old time and space consuming batch processes.

Although the invention has been described with reference to specific forms thereof, it will be understood that many changes and modifications may be made without departing from the spirit of this invention.

What is claimed is:

1. A method of preparing composite effervescent granules containing a pharmaceutically acceptable organic acid and a pharmaceutically acceptable bicarbonate salt which comprises suspending said materials in a stream of gas, contacting said materials while suspended in said stream with an aqueous fluid to cause a momentary reaction between said materials, and stopping said reaction whereby composite granules are formed.

2. A method for preparing expanded, composite, pharmaceutically active, effervescent granules which comprises suspending in a stream of hot air a dry mixture comprising a pharmaceutically acceptable organic acid and a pharmaceutically acceptable bicarbonate salt, contacting said dry mixture while suspended in said stream with an aqueous spray whereby a momentary gas forming reaction takes place producing expanded pharmaceutically active granules containing said acid and said carbonate.

3. A method according to claim 2 wherein said dry mixture also contains a pharmaceutically acceptable biphosphate salt.

4. A method according to claim 2 wherein said aqueous spray comprises an aqueous solution of a pharmaceutically acceptable biphosphate salt.

5. A method according to claim 2 wherein said aqueous spray consists essentially of water.

6. A method for preparing expanded, composite, pharmaceutically active, effervescent granules which comprises suspending in a stream of hot air a dry powdered mixture comprising citric acid and sodium bicarbonate whereby a fluidized bed is formed, spraying into said fluidized bed a fine spray of an aqueous solution containing sodium biphosphate whereby a momentary gas forming reaction takes place producing expanded pharmaceutically active granules containing citric acid, sodium bicarbonate and sodium biphosphate.

7. A method for preparing expanded, composite pharmaceutically active effervescent granules which comprises suspending in a stream of hot air a dry powdered mixture comprising tartaric acid, citric acid and sodium bicarbonate, whereby a fluidized bed is formed, spraying into said fluidized bed a fine spray of an aqueous solution containing sodium biphosphate, whereby a momentary gas forming reaction takes place producing expanded, pharmaceutically active granules containing tartaric acid, citric acid, sodium bicarbonate and sodium biphosphate.

8. A method according to claim 7 wherein said aqueous solution also contains sweetening and flavoring agents.

9. A method according to claim 7 whrein said powdered mixture is suspended in a stream of hot air flowing at the rate of from 30 to 300 cubic feet per minute, the rate of supplying the spray liquid is from 20 to 80 cc. per minute, and the hot air is maintained at temperatures in the range of 120 to 180° F.

10. A method for preparing expanded, composite pharmaceutically active effervescent granules which comprises suspending in a stream of hot air a dry powdered mixture comprising monosodium phosphate, tartaric acid, citric acid and sodium bicarbonate, whereby a fluidized bed is formed, spraying into said fluidized bed a fine spray consisting essentially of water, whereby a momentary gas forming reaction takes place producing expanded, pharmaceutically active granules containing monosodium phosphate, tartaric acid, citric acid and sodium bicarbonate.

11. A method according to claim 10 wherein said dry powdered mixture also contains sweetening and flavoring agents.

12. A method for preparing expanded, composite pharmaceutically active effervescent granules, which comprises suspending in a stream of hot air a dry powdered mixture comprising sodium bicarbonate, potassium bicarbonate, sodium citrate, monosodium phosphate, citric acid and acetaminophen, whereby a fluidized bed is formed, spraying into said fluidized bed a fine aqueous spray, whereby a momentary gas forming reaction takes place producing expanded, pharmaceutically active granules containing sodium bicarbonate, potassium bicarbonate, sodium citrate, monosodium phosphate, citric acid and acetaminophen.

References Cited

UNITED STATES PATENTS 3,207,824   9/1965   Wurster et al. _____ 264—117

ALBERT T. MEYERS, *Primary Examiner.*

SAM ROSEN, *Assistant Examiner.*